(12) United States Patent
Hood, III et al.

(10) Patent No.: US 7,961,460 B2
(45) Date of Patent: Jun. 14, 2011

(54) SYSTEM AND METHOD FOR ATTACHING PORTION OF EQUIPMENT TO REMAINDER OF EQUIPMENT

(75) Inventors: Charles D. Hood, III, Cedar Park, TX (US); Matthew McGowan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 95 days.

(21) Appl. No.: 12/425,897

(22) Filed: Apr. 17, 2009

(65) Prior Publication Data

US 2010/0265643 A1    Oct. 21, 2010

(51) Int. Cl.
  *H05K 7/16* (2006.01)
  *H05K 5/00* (2006.01)
  *H05K 7/14* (2006.01)
  *A47B 81/00* (2006.01)
  *H01M 2/10* (2006.01)
  *H01J 5/00* (2006.01)

(52) U.S. Cl. ............. 361/679.55; 361/725; 361/727; 312/223.1; 429/97; 429/99; 174/50.51; 174/542

(58) Field of Classification Search ......... 361/679.55–679.59, 679.01–679.45, 361/724–727; 312/223.1, 223.2; 429/97, 429/99; 455/575.1; 174/50, 50.51, 520, 542, 543, 560–562, 54, 58, 61
See application file for complete search history.

(56) References Cited

U.S. PATENT DOCUMENTS

| | | | |
|---|---|---|---|
| 6,542,356 B2* | 4/2003 | Gan | 361/679.58 |
| 6,583,983 B1* | 6/2003 | Chen et al. | 361/679.58 |
| 6,700,776 B2* | 3/2004 | Bang et al. | 361/679.58 |
| 7,265,986 B2* | 9/2007 | Chen et al. | 361/726 |
| 7,539,010 B2* | 5/2009 | Chen et al. | 361/679.55 |
| 7,656,653 B2* | 2/2010 | Li | 361/679.33 |
| 2005/0040740 A1* | 2/2005 | Yun | 312/223.2 |

* cited by examiner

*Primary Examiner* — Zachary M Pape
*Assistant Examiner* — Nidhi Desai
(74) *Attorney, Agent, or Firm* — Baker Botts L.L.P.

(57) ABSTRACT

Systems and methods for reducing problems and disadvantages associated with attaching portions of equipment chassis to the remainder of the equipment are provided. An information handling system may include a housing, a cover configured to at least partially enclose the housing, and an engagement assembly fixedly coupled to the housing. The cover may include an open slot having an opening and a projection. The may have a bearing movable relative to the housing, the bearing configured, when moved, to pass through the opening to engage with the projection to couple the cover to the housing.

17 Claims, 5 Drawing Sheets

SYSTEM AND METHOD FOR ATTACHING PORTION OF EQUIPMENT TO REMAINDER OF EQUIPMENT

TECHNICAL FIELD

The present disclosure relates in general to improving the appearance of an information handling system or other item of equipment, and more particularly to attaching a portion of equipment chassis to the remainder of the equipment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems have become more commonplace, consumers are influenced by numerous factors in making purchases of information handling systems. While information handling system performance and capacity (e.g., processor speed, memory, non-volatile storage, peripherals, etc.) are often factors influencing consumer choices, consumers are increasingly factoring in aesthetics of information handling systems into their choices. For example, consumers often prefer information handling systems that have a more sleek or "clean" aesthetic design. To respond to such consumer demand, it is desirable to produce information handling systems that do not include many fasteners (e.g., screws, bolts, etc.) visible from the outside of the information handling system. However, such aesthetic designs do not easily lend themselves to use of traditional fasteners.

SUMMARY

In accordance with the teachings of the present disclosure, the disadvantages and problems associated with aesthetically coupling two items of equipment have been substantially reduced or eliminated.

In accordance with an embodiment of the present disclosure, an information handling system may include a housing, a cover configured to at least partially enclose the housing, and an engagement assembly fixedly coupled to the housing. The cover may include an open slot having an opening and a projection. The may have a bearing movable relative to the housing, the bearing configured, when moved, to pass through the opening to engage with the projection to couple the cover to the housing.

In accordance with another embodiment of the present disclosure, a system may include a first item of equipment, a second item of equipment, and an engagement assembly fixedly coupled to the first item. The second item of equipment may include an open slot having an opening and a projection. The engagement assembly may have a bearing movable relative to the first item, the bearing configured to, when moved, pass through the opening to engage with the projection to couple the second item to the first item.

In accordance with a further embodiment of the present disclosure, a system for coupling a first item of equipment to a second item of equipment may include a substantially fixed member configured to be fixedly coupled to the first item and a movable member coupled to the substantially fixed member via a bearing and movable relative to the substantially fixed member. Movement of the movable member may cause a corresponding movement of a bearing substantially fixed relative to the movable member. The bearing may be configured to, when moved, pass through an opening formed in the second item to engage a projection formed in the second item to couple the second item to the first item.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-5, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Figure 1:
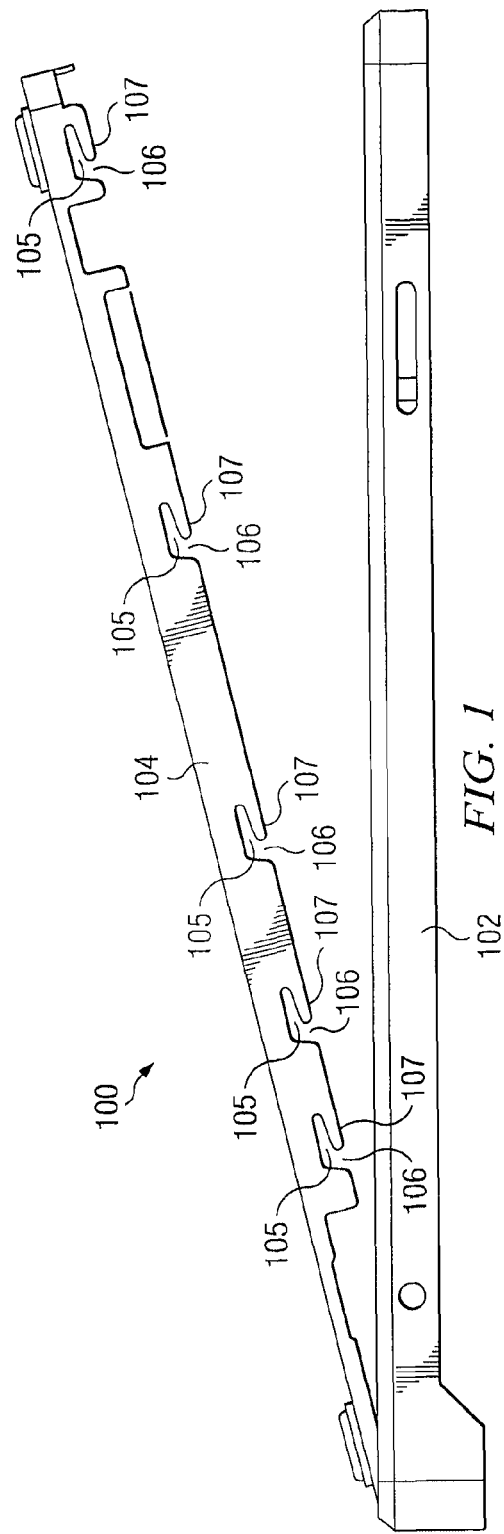
FIG. 1 illustrates an elevation view of selected components of an information handling system with a bottom cover disengaged, in accordance with embodiments of the present disclosure.
Figure 2:
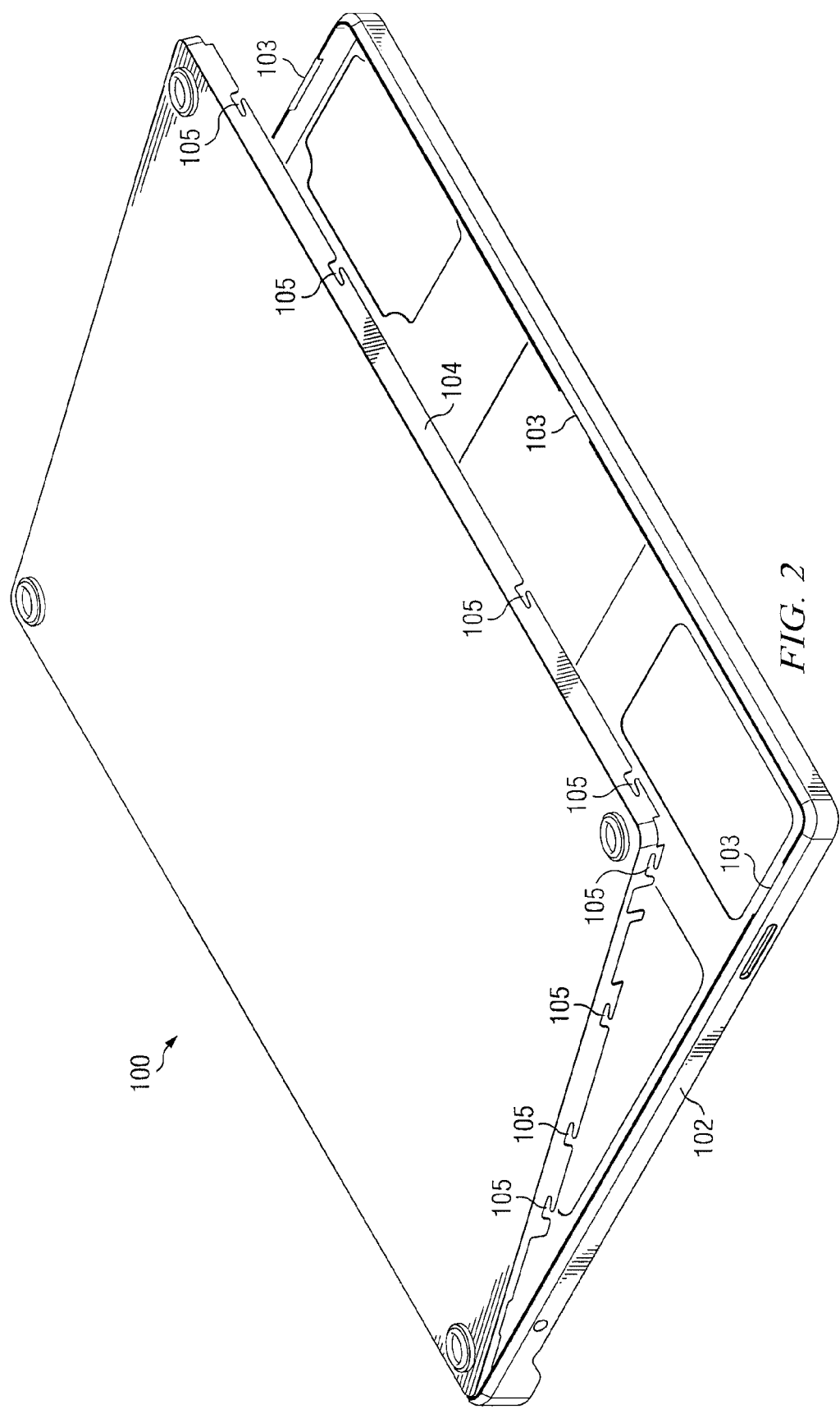
FIG. 2 illustrates an isometric view of selected components of an information handling system with a bottom cover disengaged, in accordance with embodiments of the present disclosure.
Figure 3:
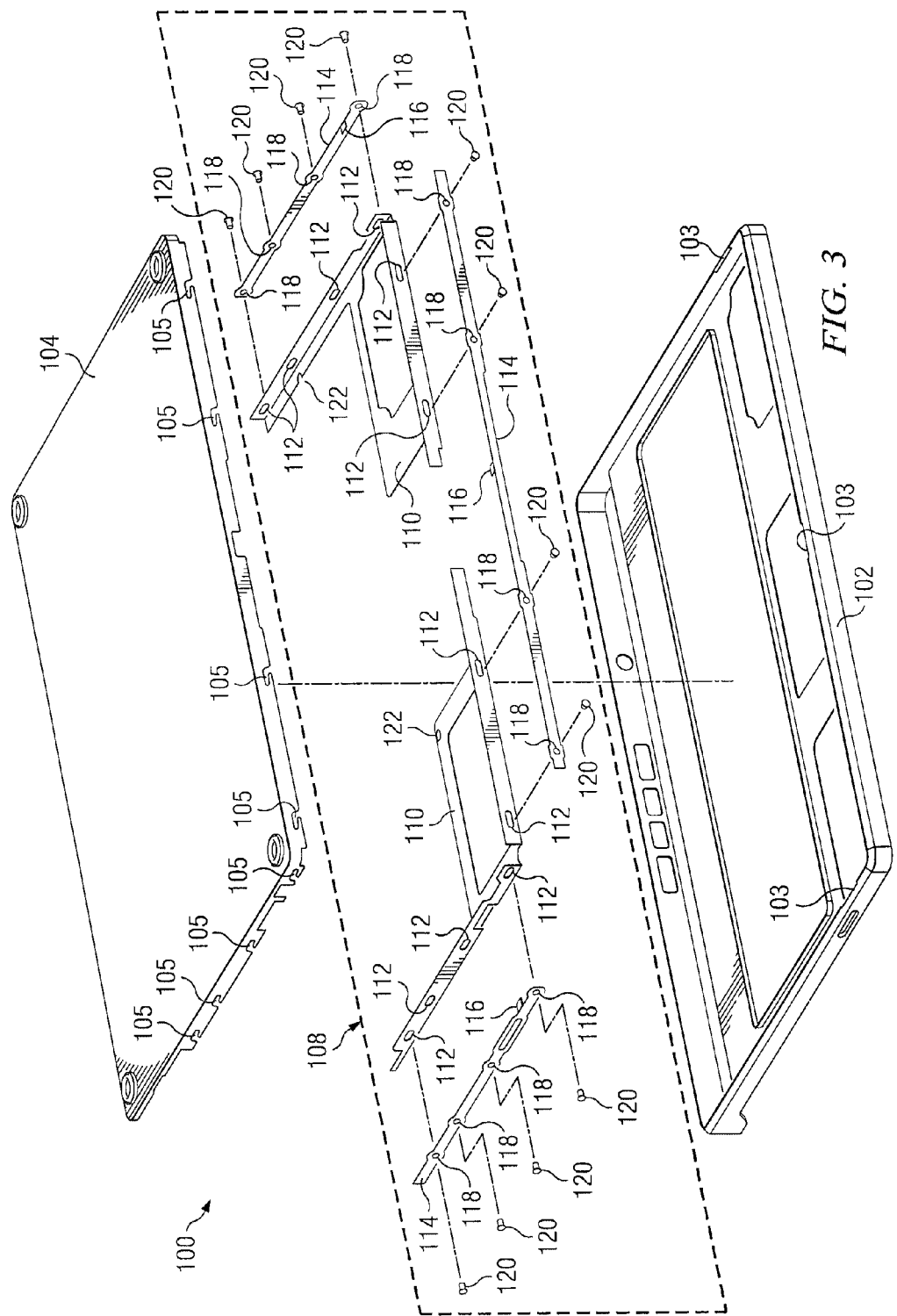
FIG. 3 illustrates an exploded view of selected components of an information handling system, in accordance with embodiments of the present disclosure.
Figure 4:
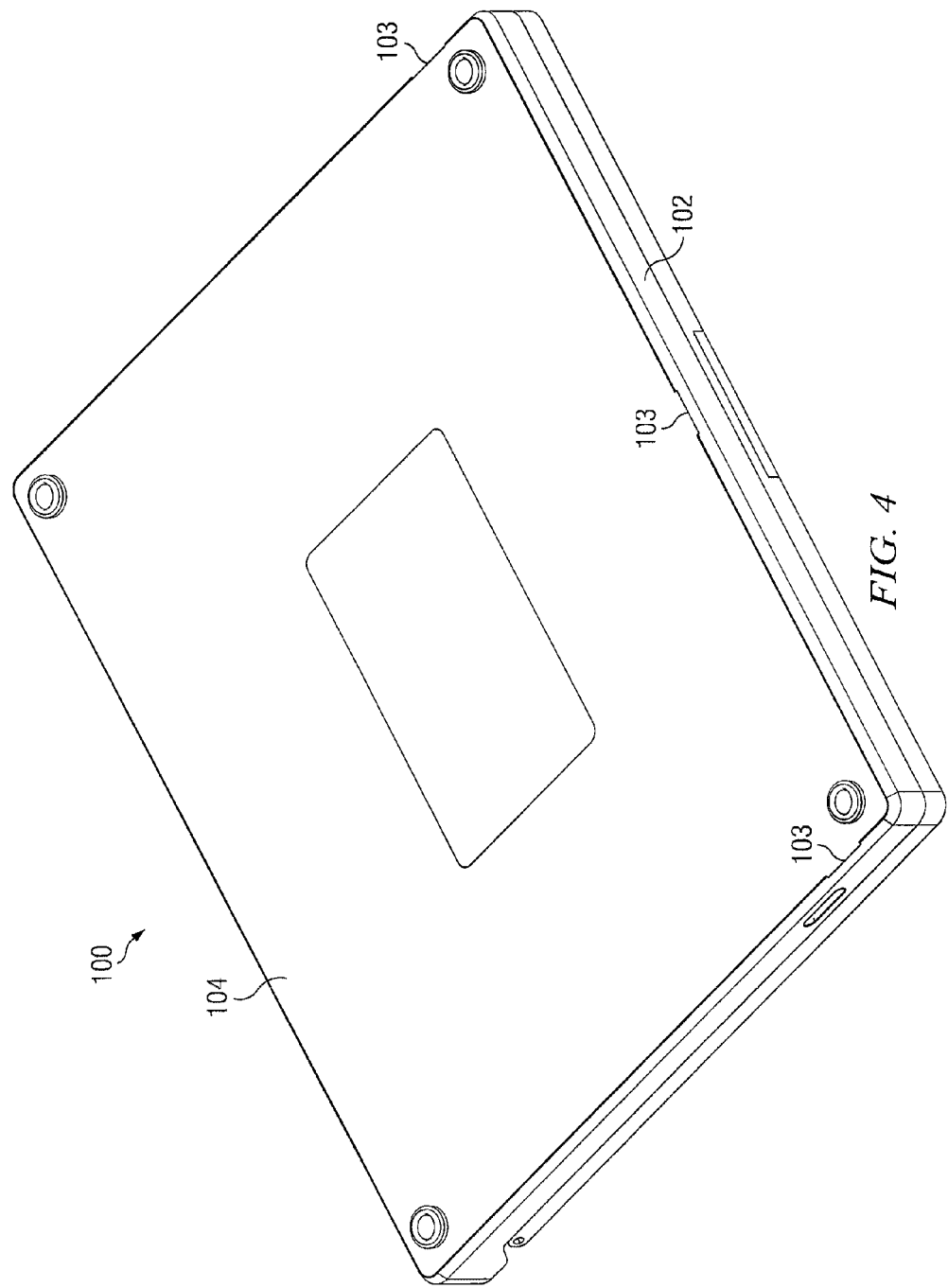
FIG. 4 illustrates an isometric view of selected components of an information handling system with a bottom cover engaged, in accordance with embodiments of the present disclosure.
Figure 5:
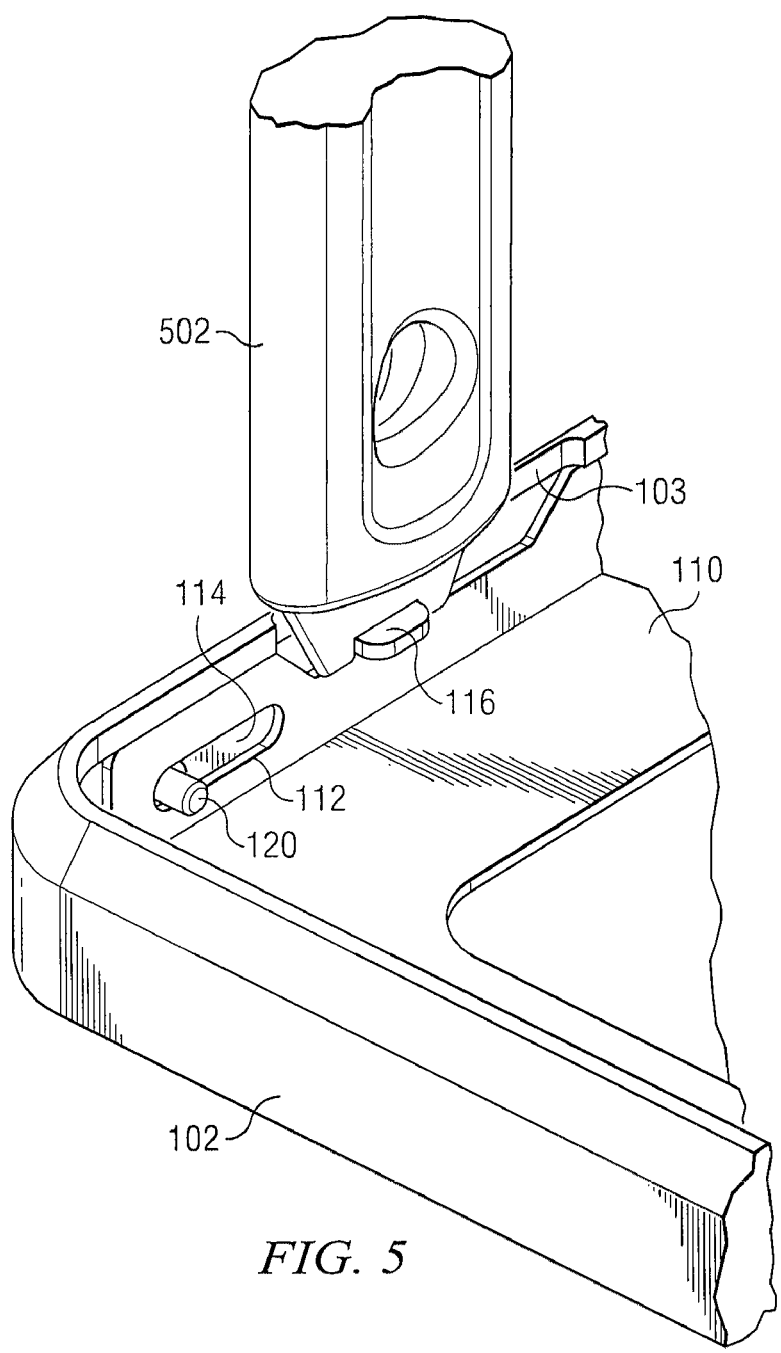
FIG. 5 illustrates a cut-away view of selected components of an information handling system and a tool used to disengage a bottom cover, in accordance with embodiments of the present disclosure.

FIGS. 1-5 illustrate various views of selected components of an information handling system 100, in accordance with embodiments of the present disclosure. FIG. 1 illustrates an elevation view of selected components of information handling system 100 with a bottom cover 104 disengaged. FIG. 2 illustrates an isometric view of selected components of information handling system 100 with bottom cover 104 disengaged. FIG. 3 illustrates an exploded view of selected components of information handling system 100. FIG. 4 illustrates an isometric view of selected components of information handling system 100 with bottom cover 104 engaged. FIG. 5 illustrates an cut-away view of selected components of information handling system 100 and a tool 502 used to disengage bottom cover 104.

As shown in FIGS. 1-5, information handling system 100 is depicted as a portable computer (e.g., a "laptop" or "notebook" computer). However, in other embodiments, information handling system 100 may be a non-portable computer (e.g., a desktop computer and/or a server) or any other suitable mobile information handling system (e.g., a mobile phone, a personal digital assistant, a portable media player, etc.).

As depicted in FIGS. 1-4, information handling system 100 may include a housing 102 and a bottom cover 104. Each of housing 102 and bottom cover 104 may be integral parts of a chassis or case for information handling system 100. Each of housing 102 and bottom cover 104 may be made from one or more suitable materials, including without limitation plastic and/or aluminum. As described in greater detail below, bottom cover 104 may be configured to couple with housing 102 such that the engagement mechanism between housing 102 and bottom cover 104 is substantially non-visible when bottom cover 104 is coupled to housing 102, such as depicted in FIG. 4, for example.

As shown in FIGS. 2-5, housing 102 may include one or more recesses 103. Each recess 103 may include an indentation in housing 102 to permit access to an engagement assembly 108 while bottom cover 104 and housing 102 are coupled, as described in greater detail below. In addition, although housing 102 is depicted as including recesses 103, bottom cover 104 may include recesses in lieu of recesses 103 of host 102, or may include recesses corresponding to recesses 103.

As shown in FIGS. 1-4, bottom cover 104 may be configured to at least partially enclose housing 102 and may include one or more open slots 105 configured to couple bottom cover 104 to housing 102, as described in greater detail below. As shown in FIG. 1, each open slot 105 may be defined, at least in part, by an opening 106 and an projection 107 (e.g., a flange) such that a bearing or other suitable structural member may pass through opening 106 and engage with projection 107. In certain embodiments, one or more of slots 105 may be formed in a extension of bottom cover 105 substantially perpendicular to an outer surface of bottom cover 104. Although FIGS. 1-4 depict open slots 105 as being generally L-shaped, open slots 105 may be of any suitable shape suitable to couple bottom cover 104 to housing 102, in accordance with this disclosure.

In addition to housing 102 and bottom cover 104, information handling system 100 may also include engagement assembly 108, as depicted in FIG. 3. Engagement assembly 108 may be coupled to housing 102, and may be configured to mechanically couple bottom cover 104 to housing 102. As shown in FIG. 3, engagement assembly 108 may include one or more substantially fixed members 110, one or more movable members 114, and one or more bearings 120.

As shown in FIG. 3, each substantially fixed member 110 may include one or more substantially enclosed longitudinal slots 112 and one or more mounting openings 122. Each substantially enclosed longitudinal slot 112 may be configured to receive a bearing 120 such that bearing 120 is slidable or otherwise movable substantially along one axis about the longitudinal length of its corresponding enclosed longitudinal slot 112. In certain embodiments, one or more bearings 120 may be movable substantially along one axis wherein the axis is substantially parallel to a substantially planar outer surface of bottom cover 104.

Each mounting opening 122 may be circular, elliptical, rectangular, or any other suitable shape, and may be configured to receive a screw, bolt, and/or other fastener in order to fixedly couple its associated substantially fixed member 110 to housing 102.

As shown in FIG. 3, each movable member 114 may include a projection 116 and one or more substantially enclosed slots 118. Each substantially enclosed slot 118 may be configured to couple its associated movable member 114 to a substantially fixed member 110 via one or bearings 120 such that movable member 114 is slidable or otherwise movable substantially along one axis relative to its associated fixed member 110, and such that the one or more bearings 120 are substantially fixed relative to movable member 114.

Projection 116 may include a flange or other suitable structural member that may allow a person or machine to slide or move movable member 114 relative to substantially fixed member 110 by applying a mechanical force to projection 116, as depicted in FIG. 5, for example. FIG. 5 depicts selected components of information handling system 100, with bottom cover 104 illustratively cut away for purposes of exposition. As shown in FIG. 5, a tool 502 operated by a person and/or machine may engage projection 116 and apply mechanical force to slide or otherwise move projection 116 such that the movable member 114 associated with projection 116 slides or otherwise moves relative substantially fixed member 110 to which the movable member 114 is coupled, and in an axis substantially parallel to the longitudinal length of a substantially enclosed longitudinal slot 112 of the substantially fixed member 110 coupled to the movable member 114. Tool 502 may be any device, system or apparatus configurable to suitably engage with projection 116, and may include a screwdriver, blade, pen knife, and/or a proprietary tool provided by a manufacturer, seller, or other provider of information handling system 100.

In operation, bottom cover 104 may be coupled to housing 102 via engagement assembly 108. For example, bottom cover 104 may be appropriately placed on, in contact with, or proximate to housing 102 such that open slots 105 substantially line up with substantially enclosed longitudinal slots 112 and bearings 120 pass through openings 106 of open slots 105. A person and/or machine may then apply mechanical force to slide or otherwise move projections 116 (e.g., via tool 502), which in turn may slide or otherwise move movable member 114 and bearings 120 relative to open slots 105, thus engaging bearings 120 with projections 107, and fixedly coupling bottom cover 104 to housing 102. When engagement assembly is engaged as described in this paragraph, bottom cover 104 may be coupled to housing 102 such that the components coupling bottom cover 104 to housing 102 (e.g., engagement assembly 108) are substantially non-visible from one side of cover 104 (e.g., non-visible from the bottom surface of bottom cover 104), except for small portions that may be visible through recesses 103. However, because projections 116 may be accessed via a tool with a thin profile, as shown in FIG. 5, the projection access openings formed by recesses 103 may be practically unnoticeable. For example, in some embodiments, the width of one or more of recesses 103 may be 0.6 mm. Accordingly, the systems and methods described herein may provide a "clean" or "sleek" look without any fastening devices practically visible from the outside of information handling system 100.

To decouple bottom cover 104 from housing 102 (e.g., to allow a user to change a battery, or add or remove a component), a person and/or machine may slide or otherwise move projections 116 (e.g., via tool 502), which in turn may slide or otherwise move movable member 114 and bearings 120 relative to open slots 105, thus disengaging bearings 120 from projections 107 and allowing bearings 120 to pass through openings 106, such that bottom cover 104 may be decoupled from housing 102.

Although FIGS. 1-5 depict housing 102 being coupled to bottom cover 104 along three sides of information handling system 100 via engagement assembly 108, other embodiments may be implemented whereby engagement assembly 108 coupled housing 102 to bottom cover 104 along one, two, or four sides. In addition, with respect to sides in which engagement assembly 108 is not used to coupled housing 102 to bottom cover 104, other suitable coupling mechanisms may be used. For example, in the embodiment depicted in FIGS. 1-5, the one side for which engagement assembly 108 is not used to coupled housing 102 to bottom cover 104, a "slot and tab" or similar mechanism may be used.

Although information handling system 100 is shown in FIGS. 1-5 as having certain components (e.g., housing 102, bottom cover 104, and engagement assembly 108), information handling system 100 may include any other suitable components (e.g., motherboards, processors, memories, storage media, expansion cards, displays, etc.) which may not have been depicted in FIGS. 1-5 for the purposes of clarity and exposition.

In addition, although the present disclosure describes use of engagement assembly 108 to coupled housing 102 to bottom cover 108, systems and methods similar to those set forth in this disclosure may be utilized to suitably couple any portion of an information handling system to another portion of the information handling system, or may be utilized to suitably couple any item of equipment to another item of equipment.

Using the methods and systems disclosed herein, problems associated with conventional approaches of coupling two items of equipment (e.g., two portions of an information handling system) may be reduced or eliminated. For example, methods and systems disclosed herein may provide a technique for affixing a portion of a information handling system to the remainder of the information handling system without having any fasteners visible on the outside of the information handling system.

Although the present disclosure has been described in detail, it should be understood that various changes, substitutions, and alterations can be made hereto without departing from the spirit and the scope of the disclosure as defined by the appended claims.

What is claimed is:

1. An information handling system, comprising:
a housing;
a cover configured to at least partially enclose the housing, the cover including an open slot having an opening and a projection; and
an engagement assembly fixedly coupled to the housing, the engagement assembly having a bearing movable relative to the housing, the bearing configured, when moved, to pass through the opening to engage with the projection to couple the cover to the housing, the engagement assembly configured to couple the cover to the housing such that engagement assembly is substantially non-visible from the exterior of the information handling system when the cover is coupled to the housing; the engagement assembly including: a substantially fixed member fixedly coupled to the housing; and a movable member coupled to the substantially fixed member via the bearing and movable relative to the substantially fixed member, wherein movement of the movable member causes a corresponding movement of the bearing.

2. An information handling system according to claim 1, wherein:
the cover includes a plurality of open slots each having an opening and a projection; and
the engagement assembly having a plurality of bearings movable relative to the housing, each of the plurality of bearings configured to, when moved, pass through a corresponding one of the plurality of openings to engage with a corresponding one of the plurality of projections.

3. An information handling system according to claim 1, wherein the bearing is substantially fixed relative to the movable member.

4. An information handling system according to claim 1, further comprising:
the substantially fixed member including a substantially enclosed longitudinal slot having a longitudinal length, the substantially enclosed longitudinal slot configured to receive the bearing to couple the substantially fixed member to the movable member; and
the bearing movable substantially along one axis about the longitudinal length of longitudinal slot.

5. A system according to claim 4, the one axis substantially parallel to a substantially planar outer surface of the cover.

6. An information handling system according to claim 1, the movable member including a second projection configured to allow at least one of a person and a machine to apply force to the second projection to induce movement of the movable member.

7. An information handling system according to claim 6, wherein at least one of the housing and the cover includes a recess, the recess forming an access opening proximate to the second projection between the cover and the housing while the cover is coupled to the housing such that at least one of a person and a machine may apply force to the second projection via the access opening.

8. An information handling system according to claim 7, the access opening configured to receive a tool such that force may be applied to the second projection via the tool.

9. A system comprising:
a first item of equipment;
a second item of equipment including an open slot having an opening and a projection; and an engagement assembly fixedly coupled to the first item, the engagement assembly having a bearing movable relative to the first item, the bearing configured to, when moved, pass through the opening to engage with the projection to couple the second item to the first item, the engagement assembly configured to couple the second item to the first item such that engagement assembly is substantially non-visible from the exterior of the system when the second item is coupled to the first item; the engagement assembly including: a substantially fixed member fixedly coupled to the first item; and a movable member coupled to the substantially fixed member via the bearing and movable relative to the substantially fixed member, wherein movement of the movable member causes a corresponding movement of the bearing.

10. A system according to claim 9, wherein:
the second item includes a plurality of open slots each having an opening and a projection; and
the engagement assembly having a plurality of bearings movable relative to the first item, each of the plurality of bearings configured to, when moved, pass through a corresponding one of the plurality of openings to engage with a corresponding one of the plurality of projections.

11. A system according to claim 9, wherein the bearing is substantially fixed relative to the movable member.

12. A system according to claim 9, further comprising:
the substantially fixed member including a substantially enclosed longitudinal slot having a longitudinal length, the substantially enclosed longitudinal slot configured to receive the bearing to couple the substantially fixed member to the movable member; and
the bearing movable substantially along one axis about the longitudinal length of the longitudinal slot.

13. A system according to claim 12, the one axis substantially parallel to a substantially planar outer surface of the second item.

14. A system according to claim 9, the movable member including a second projection configured to allow at least one of a person and a machine to apply force to the second projection to induce movement of the movable member.

15. A system according to claim 14, wherein at least one of the first item and the second item includes a recess, the recess forming an access opening proximate to the second projection between the second item and the first item while the second item is coupled to the first item such that at least one of a person and a machine may apply force to the second projection via the access opening.

16. A system for coupling a first item of equipment to a second item of equipment, comprising:
a substantially fixed member configured to be fixedly coupled to the first item, the substantially fixed member including a substantially enclosed longitudinal slot having a longitudinal length, the substantially enclosed longitudinal slot configured to receive a bearing; and
a movable member coupled to the substantially fixed member via the bearing and movable relative to the substantially fixed member, wherein:
movement of the movable member causes a corresponding movement of the bearing substantially fixed relative to the movable member; and
the bearing is configured to, when moved, pass through an opening formed in the second item to engage a projection formed in the second item to couple the second item to the first item, the bearing movable substantially along one axis about the longitudinal length of the longitudinal slot, the one axis substantially parallel to a substantially planar outer surface of the second item.

17. A system according to claim 16, the movable member including a second projection configured to allow at least one of a person and a machine to apply force to the second project to induce movement of the movable member.

* * * * *